| United States Patent [19] | [11] Patent Number: 5,035,872 |
| Löblich et al. | [45] Date of Patent: Jul. 30, 1991 |

[54] METHOD OF PREPARING POTASSIUM MAGNESIUM PHOSPHATE

[75] Inventors: Karl-Richard Löblich, Barsinghausen; Susanne Lange, Woltershausen, both of Fed. Rep. of Germany

[73] Assignee: Kali und Salz Aktiengesellschaft, Kassel, Fed. Rep. of Germany

[21] Appl. No.: 518,113

[22] Filed: May 3, 1990

[30] Foreign Application Priority Data

May 5, 1989 [DE] Fed. Rep. of Germany ....... 3914796

[51] Int. Cl.$^5$ .............................................. C01B 25/45
[52] U.S. Cl. ......................................... 423/306; 71/41
[58] Field of Search .............................. 71/41; 423/306

[56] References Cited

U.S. PATENT DOCUMENTS

| 4,217,333 | 8/1980 | Loblich | 423/306 |
| 4,496,526 | 1/1985 | Loblich | 423/306 |
| 4,536,376 | 8/1985 | Loblich | 423/306 |

*Primary Examiner*—Wayne A. Langel
*Attorney, Agent, or Firm*—Collard, Roe & Galgano

[57] ABSTRACT

A method of preparing potassium magnesium phosphate hexahydrate by reacting calcium dihydrogen phosphate with potassium sulfate and a basic magnesium compound is described.

10 Claims, No Drawings

METHOD OF PREPARING POTASSIUM MAGNESIUM PHOSPHATE

The ions of the compound potassium magnesium phosphate are required nutrients for all green plants. Since the compound is not very soluble, even an overdose of it to the neutral to slightly acidic soil will not cause a toxic concentration of these nutrients. In spite of such low saturation concentrations, however, finely divided potassium magnesium phosphate has a large specific surface that allows it to dissolve rapidly enough to almost immediately replace any nutrients the plants extract from the soil. This compound accordingly makes it possible to provide the soil with a stored fertilizer that will release nutrients as needed.

Many methods of preparing the compound are known. A preliminary survey will be found in Gmelins Handbuch der Anorganischen Chemie, 8th edition, System No. 27 (B), Issue 4 (1939), pages 465–466. The point of departure for the procedures cited therein are starting materials that can only be obtained from the available raw materials by complicated processing. Such a method is described in German OS No. 1 924 284 and starts with phosphoric acid, magnesium oxide, and potassium hydroxide.

Subsequent proposals aimed at the use of the chlorides and sulfates of potassium instead of the expensive potassium compounds. German Patent No. 619 397 describes expelling hydrogen chloride from potassium chloride and magnesium chloride by heating with phosphoric acid to prepare the potassium magnesium phosphate.

The procedure, however, consumes a lot of energy, entails serious corrosion problems, and can only be employed when the hydrogen chloride can be effectively used.

Japanese Patent No. 17 694, Belgian Patent No. 6 481 111, and British Patent No. 969 419 teach precipitating potassium magnesium phosphate from seawater, although the products are very impure.

German Patent No. 1 265 726, U.S. Pat. No. 3,615,186, and Belgian Patent No. 740 307 recommend reacting potassium and magnesium chloride or sulfate with phosphoric acid in the presence of organic amines. When the potassium magnesium phosphate is precipitated, the amines remain in the mother liquor in the form chlorides or phosphates. The amines can be quantitatively recovered from the mother liquor only with considerable engineering expenditure.

German Patent No. 2 831 672 discloses how potassium chloride can be reacted with phosphoric acid or magnesium dihydrogen phosphate and magnesium oxide to obtain potassium magnesium phosphate without such auxiliary agents as amines. The resulting mother liquors can no longer be used in the process and are problematic to store.

The following proposals attempt to avoid mother liquors that are difficult to process or dispose of. According to French Patent No. 722 378, calcium dihydrogen phosphate, potassium sulfate, and magnesium oxide are mixed with water to obtain products that contain potassium magnesium phosphate.

A similar teaching is found in German AS No. 1 767 329.

These suggestions are improved by the teaching communicated in German OS No. 3 326 796 according to which the calcium dihydrogen phosphate is first reacted with potassium sulfate to obtain syngenite and a solution of potassium dihydrogen phosphate, the syngenite is separated, and the potassium magnesium phosphate is then precipitated with magnesium oxide, using the mother liquor from the precipitation to elute the calcium dihydrogen phosphate. The two products syngenite and potassium magnesium phosphate are separately granulated and only then mixed together to prevent secondary reactions in the granulate and to ensure the nutrients' long-term availability to the plants.

German Patent No. 3 204 238 establishes the foundations for the procedure outlined in German Patent No. 3 216 973, which describes precipitating potassium magnesium phosphate from a solution that contains soluble phosphate and potassium and magnesium sulfate with a basic magnesium compound and treating the mother liquor with calcium oxide or hydroxide to decrease the consumption of the expensive magnesium compound. Phosphoric acid is added to the mixture of magnesium hydroxide and gypsum in the solution that results from precipitating the lime to separate the magnesium in the form of magnesium dihydrogen phosphate, which goes into solution, subsequent to which the gypsum is eliminated from the solution. The resulting phosphate solution is precipitated again to obtain the potassium magnesium phosphate.

Expanding on this approach, German Patent No. 3 216 973 discloses another variation that allows practical exploitation of the calcite-rich raw phosphates.

Multiple repetition of the procedures that this German patent is based on, however, has revealed that the separated gypsum is often contaminated with considerable amounts of coprecipitated potassium calcium sulfate double salts. The reason is the high content of potassium sulfate in the solution from which the gypsum is precipitated along with the lime. Under these conditions syngenite is the stable precipitate below 333K and pentasulfate above this temperature, meaning that the gypsum can appear only as a metastable precipitate that can sometimes transform very rapidly into the stable substances.

Since the gypsum is rejected, the occurrence of the aforesaid double salts in it leads to considerable loss of the original potassium from the yield. It would accordingly be desirable to discover appropriate means of preventing the formation of double salts while simultaneously simplifying the process.

A process has now been found for preparing potassium magnesium phosphate hexahydrate by reacting calcium dihydrogen phosphate with potassium sulfate and an alkaline magnesium compound in two stages while isolating the gypsum produced thereby as the second solid substance.

The method is characterized by the combination of the following steps:
  the potassium sulfate needed in the first stage is introduced during the second stage before or simultaneously with the addition of the magnesium oxide and/or hydroxide and, after the potassium magnesium phosphate has been crystallized and separated, is transferred along with the mother liquor to the first stage, where the mother liquor in accordance with the rate of reaction to the suspension of the finely divided calcium dihydrogen phosphate in a reacted-out slurry that is obtained from the outlet from that stage and is recirculated back into it, and contains a seed in the form of the already formed gypsum, and is added to the gypsum wash filtrate, the practically reacted-out slurry coming from the first stage is divided into one portion that is recirculated to suspend the calcium dihydrogen phosphate and another portion that, after the gypsum has been separated, provides the potassium dihydrogen phosphate solution needed for the second stage, the clarified potassium dihydrogen phosphate solution from the first stage is measured along with or immediately after the addition of the magnesium oxide and/or hydroxide and the potassium sulfate into the reacted-out slurry obtained from the outlet of the second stage and containing a seed in the form of the already formed potassium magnesium phosphate as it is being recirculated back into it, a crystallization promoter in the form of ammonia is introduced during the second stage, and the reacted-out slurry leaving the second stage is divided into one portion that is returned to the intake and another portion that is divided by filtering into the potassium magnesium phosphate hexahydrate product that is not washed with water before being dried and the mother liquor that will be recirculated to the first stage.

The method is also characterized in that the calcium dihydrogen phosphate in the first stage is suspended in water with approximately the same amount of gypsum suspended in the potassium dihydrogen phosphate solution as it is formed and with the filtrate from washing the gypsum that is to be removed and is reacted at a temperature of between 308 and 333K with the mother liquor of the potassium magnesium phosphate crystallization that contains the potassium sulfate and is added more or less in accordance with how rapidly the reaction is proceeding and the resulting, practically reacted-out slurry is divided, one portion of it being recycled to the intake of the first stage and the other portion being concentrated and filtered, subsequent to which the separated gypsum is washed and removed and the clarified potassium dihydrogen phosphate solution is recirculated to the second stage.

It is also essential for the gypsum removed from the first stage to be washed with the same amount of water as was extracted along with the products of both stages in the form of water of crystallization and adherent water less the amount of water formed during the reaction and introduced along with the reactants, and the wash filtrate is fed to the intake of the first stage.

It is also essential for the potassium dihydrogen phosphate solution obtained from the first stage after the gypsum has been separated to contain potassium phosphates and sulfates to the extent of 90 to 100 g of potassium dihydrogen phosphate and 15 to 25 g of potassium sulfate per 1000 g of water.

It is also significant for the magnesium oxide and/or hydroxide from the second stage to be dispersed first along with the potassium sulfate in reacted-out slurry derived from the outlet of this stage and recirculated to its intake, subsequent to which the potassium dihydrogen phosphate solution obtained from the first stage is added, the reaction mixture is stirred for 20 to 30 minutes at 303 to 315K, the slurry derived from this stage is separated into a portion that is to be recirculated and another portion that is to be processed, and the potassium magnesium phosphate is separated in the form of the hexahydrate from the mother liquor in the portion that is to be processed and removed as the product, subsequent to which the mother liquor is recirculated to the first stage.

In one preferred version of the method the potassium dihydrogen phosphate solution is recirculated to the intake of the second stage along with the recirculated slurry, the magnesium oxide and/or hydroxide and potassium sulfate, and the potassium sulfate is mixed with the magnesium oxide and/or hydroxide before being introduced in the second stage.

The method is also characterized in that the mother liquor from the second stage contains 90 to 100 g of potassium sulfate and between 8 and 70 g of magnesium sulfate per 1000 g of water and in that ammonia is introduced into the reaction mixture at the intake of the second stage at a ratio of at least 1 kg/ton of potassium magnesium phosphate product and no more than 1 mole per mole of free phosphoric acid with impure calcium dihydrogen phosphate. The potassium magnesium phosphate is not washed with water but at the most with potassium dihydrogen phosphate solution and the resulting wash filtrate is recirculated to the second stage.

The method in accordance with the present invention is accordingly distinguished from the one described in German Patent No. 3 204 238 by being carried out in two stages like the method described in German OS No. 3 326 796 and allowing the solution to circulate in a closed system. In contrast to the latter, however, the method in accordance with the present invention does not yield any product in the form of syngenite. Accordingly, it produces a high yield of both phosphate and potassium in conjunction with its potassium magnesium phosphate product.

Neither Patent No. 3 204 238 nor German OS 3 216 973 mentions anything about how the mother liquor that results from the crystallization of the potassium magnesium phosphate might be used. It is only the inclusion of the raw-phosphate disintegration that allows in the expanded version the exploitation of the mother liquor at the price of greater complexity in the process as a whole.

The method in accordance with the invention, on the other hand, represents an extensive simplification. The starting phosphate is the product, derived from reacting the raw phosphate with phosphoric acid, called triplesuperphosphate (TSP). The main constituent of TSP is calcium dihydrogen phosphate. In addition to other ancillary constituents, it also contains some free phosphoric acid. It is preferable to carry out the method in accordance with the invention continuously.

In the first stage of the method in accordance with the invention, the triple-superphosphate is converted into gypsum and a potassium dihydrogen phosphate solution with mother liquor obtained from the second stage and containing the potassium sulfate added during the second stage. In the second stage, magnesium oxide and/or hydroxide is converted into potassium magnesium phosphate hexahydrate and mother liquor with the potassium dihydrogen phosphate solution obtained during the first stage in the presence of the now added potassium sulfate. The mother liquor is recirculated to the first stage. No solutions are released into the environment.

If any yield is lost in this procedure, it can only be lost during the first stage because all substances of value become part of either the potassium magnesium phosphate product or the mother liquor, which is recirculated to the first stage. Any substances of value that become lost can only be removed with the gypsum.

The method in accordance with the invention minimizes the loss of phosphates in that the phosphate solution that is produced in the first stage is limited to no more than 100 g of potassium dihydrogen phosphate per 1000 g of water and in that the resulting gypsum is thoroughly washed with water, with the filtrate being recirculated to the first stage.

Losses of both phosphates and potassium are also decisively decreased by the procedure employed in the first stage. The triplesuperphosphate, which has been milled to less than 0.1 mm, is dispersed in a mixture of practically reacted-out slurry, which is obtained from the outlet of the first stage and recirculated to its intake, and of the gypsum-wash water before the mother liquor, which has been obtained from the second stage and contains the potassium sulfate needed for the reaction, is introduced in accordance with how rapidly the reaction is proceeding. This approach essentially prevents the concentration of potassium sulfate from exceeding the level at which syngenite would form in the reaction mixture while the reaction is proceeding and beyond a critical interval of time even though the potassium sulfate in the mother liquor is considerably above the level that determines the formation of syngenite. Any syngenite forming during that time would include phosphate and would decompose too slowly once the concentration of potassium sulfate had dropped. Another advantage of recirculating the reacted-out slurry from the outlet of the first stage back into its intake is that gypsum is available for seeding at the very beginning of the reaction. This procedure decisively improves the filtering properties of the gypsum.

The first stage described herein allows in any case potassium yields of more than 97% and phosphate yields of between 85 and 90% when the triplesuperphosphate is milled finely enough. The major loss of phosphate derives from the proportion of undigested apatite in the TSP. Very little soluble phosphate is lost. Since it contains so little phosphate, the gypsum can, if there is no other means of exploiting it, have a little quicklime or dissolved lime added to it to bind the soluble constituents and can be stockpiled without affecting the environment.

The gypsum can, however, since it contains some residual phosphate, be added to other fertilizers, in which case the first stage can be directed only at potassium and not necessarily at phosphate yields. In this case, the triplesuperphosphate can be coarser.

It is of decisive significance to the second stage of the method in accordance with the invention, the stage at which the potassium magnesium phosphate is crystallized by reacting the magnesium oxide and/or hydroxide with the potassium dihydrogen phosphate solution from the first stage, for the basic magnesium compound to be kept from coming into contact with the potassium dihydrogen phosphate solution, for the temperature not to exceed 315K, and for the crystallization to be initiated by the addition of at least 1 kg ammonia (calculated anhydrous) per metric ton of product and to be aided by a high level of potassium sulfate in the reaction mixture. When the method is carried out continuous, as preferred, and with a cascade of mixing vessels, the potassium dihydrogen phosphate solution must never be introduced into the first vessel or the magnesium oxide into the second.

Optimal results are obtained by recirculating the reacted-out slurry obtained from the outlet of the second stage (from the last vessel) into its intake (the first vessel). The recirculated slurry makes it possible to disperse the magnesium oxide and/or hydroxide and the potassium sulfate before or with the introduction of the potassium dihydrogen phosphate and simultaneously makes the seed that promotes the crystallization available at the intake of the second stage.

The slurry obtained from the second stage is divided. One portion is recirculated to the intake of that stage. The product in the form of the potassium magnesium phosphate hexahydrate is separated from the mother liquor in the other portion. The clarified mother liquor with its potassium sulfate content is recirculated to the first stage.

The potassium magnesium phosphate filter cake is washed not with water but only with the potassium dihydrogen phosphate solution obtained from the first stage. The advantage of this procedure is that it prevents the companion salts entrained in with the starting materials and the magnesium sulfate generated in the solution-circulating system by ancillary reactions from becoming enriched beyond a tolerable extent. If the cake has been washed with the potassium dihydrogen phosphate solution, the filtrate is recirculated to the intake of the second stage.

The ancillary reactions that occur in all the known methods always produce in addition to the potassium magnesium phosphate hexahydrate a certain percentage of trimagnesium phosphate (8)hydrate. The ancillary reaction in the method in accordance with the invention is significantly inhibited by the addition of small amounts of ammonia and its derivative ammonium ions, resulting in a product that is significantly purer than it would be without the additive. Washing with the potassium dihydrogen phosphate solution further lowers the product's level of trimagnesium phosphate and converts any excess magnesium hydroxide.

The high purity of the resulting potassium magnesium phosphate eliminates the need to wash it with water and renders acceptable the secondary formation of a small amount of trimagnesium phosphate due to the reaction of magnesium potassium phosphate with magnesium sulfate from the solution that adheres during drying. Even when impure starting materials of fertilizer-quality are employed, the result is a dried product with a potassium content of more than 80% as potassium magnesium phosphate.

Magnesium sulfate is also formed in the circulating solution by the reaction of free phosphoric acid with magnesium oxide or hydroxide and potassium sulfate to obtain potassium magnesium phosphate. Many varieties of triplesuperphosphate contain, in addition to calcium dihydrogen phosphate, considerable levels of free phosphoric acid, increasing not only the consumption of magnesium oxide or hydroxide but also the level of magnesium sulfate in the recirculating solution. It has been demonstrated to be advantageous when acid-rich varieties of TSP are employed to increase the amount of ammonia employed in accordance with the invention to 1 mole per mole of phosphoric acid, preventing the formation of magnesium sulfate while the acid is being reacted. An equivalent proportion of ammonium magnesium phosphate hexahydrate will of course occur in the product, although this drawback will be more than compensated for by reduction in the proportion of trimagnesium phosphate.

How much magnesium oxide and/or hydroxide is to be introduced in the second stage is determined stoichiometrically, with an excess of up to 5% being permissible. In the starting materials, however, only the reactive proportion can be considered in carrying out the calculations.

This is in the case of oxide or hydroxide reacted by stirring 1 g of the substance with 100 ml of a solution that contains 200 g of ammonium chloride per 1000 g of water in a closed vessel at 323 K. The batch is cooled 30 minutes later and the amount of ammonia is determined, which is a measure of the reactive proportion.

The preferred way of carrying out the method in accordance with the invention is continuous, with a cascade of mixing vessels in each stage. Preferably, a cascade of this type is designed as a multicellular compartmentalized cascade like those often employed to obtain phosphoric acid from raw phosphate with sulfuric acid. The basic form of a compartmentalized cascade is an elongated box-shaped vessel divided into communicating cells by alternately upright and immersed baffles. One or more of the initial cells are feed cells equipped with high-speed toothed-disk mixers, whereas the subsequent cells are equipped with slower mixers that are powerful enough to maintain any remaining or new solids in suspension. A compartmentalized cascade has a free outlet. The difference in levels between the first and last cells depends of course on the throughput. Each stage of the present method employs compartmentalized cascades of eight to ten cells.

The method in accordance with the invention involves, in addition to the main circulation system between the first and second stages, between which the composition of the solution changes in accordance with the steps of the reaction, two slurry circulation systems that result from recirculation of the partial streams from its outlet back to the intake of a cascade in each stage.

The method in accordance with the invention allows a closed solution-circulating system in a much more simple and reliable manner than the method disclosed in German OS No. 3 216 973 and accordingly avoids damage to the environment much more effectively. In contrast to the method disclosed in German OS No. 3 326 796, furthermore, this objective is attained without creating syngenite.

The two-stage method in accordance with the invention will now be described with reference to the following examples:

EXAMPLE 1

Characterizing the starting materials

The triplesuperphosphate contains 45.7% $P_2O_5$. The main constituent, at 69.5%, is calcium dihydrogen phosphate hydrate. In addition to 4.5% magnesium and sodium dihydrogen phosphates, it contains 1.7% free phosphoric acid and 5.8% apatite. Gypsum, sand, and clayey substances are impurities. Even sodium chloride is represented, at 0.38%.

The potassium sulfate (51.0% $K_2O$) is of fertilizer quality and comprises 92.4% $K_2SO_4$, 1.6% KCl, 0.2% NaCl, 3.5% $MgSO_4$, 1.2% $CaSO_4$, and 0.3% insolubles.

The magnesium oxide is 95.5% pure MgO; the content of reactive MgO is 88.9% reactive.

The apparatus for the first stage of the process comprises a compartmentalized cascade with eight cells, a device for withdrawing seed slurry from the last cell and returning it to the first cell, a four-meter clarifier, and a continuous-operation filter, plus the requisite pipeline and metering controls.

4.6 m³ of wash filtrate, 14 m³ of seed slurry recirculated from the last cell, and 1.612 tons of triplesuperphosphate milled to less than 0.1 mm per hour are continuously supplied to the first cell. 11.7 m³ per hour of mother liquor obtained from the second stage are divided into three portions, one being supplied to each of the first three cells. The mother liquor from the second stage contains 96 g of potassium sulfate, 23 g of magnesium sulfate, 1 g of sodium sulfate, and 17 g of sodium chloride per 1000 g of water.

The temperature in the cascade is set at approximately 323 K. After a dwell time of 30 minutes, the unrecirculaed slurry component is fed to the clarifier. The clear phosphate solution contains 93 g of potassium dihydrogen phosphate, 2 g of phosphoric acid, 23 g of potassium sulfate, 22 g of magnesium sulfate, 5 g of calcium sulfate, 2 g of sodium sulfate, and 15 g of sodium chloride per 1000 g of water. It is put aside as clarifier output and then measured into the second stage.

The concentrated clarifier sediment from the first stage is fed to a filter. The filter cake is washed with 2.3 m³ of water. The combined filtrates are forwarded in the form of a wash filtrate to the first cell of the cascade. 1.67 tons of filter cake are removed. It contains approximately 32% adhering moisture. In dry terms, it contains 1.14 tons of reaction gypsum, most of which, approximately 71%, is $CaSO_4.2H_2O$. The dry substance comprises 8.3% $P_2O_5$, 0.91% $K_2O$, and 29.7% CaO. If not used, 28 kg of calcium hydroxide per ton of dry substance is added to the moist reaction gypsum, which is then stockpiled. The calcium hydroxide prevents traces of phosphate from leeching out of the stockpile.

The apparatus employed in the second stage is very similar to that employed in the first. It is complemented with a drier for the potassium magnesium phosphate product. Every other cell is equipped with a heat exchanger to remove the heat of reaction. 14 m³ of seed slurry per hour are pumped from the last cell of the cascade back to the first cell.

0.397 tons of technical magnesium oxide and 0.78 tons of potassium sulfate per hour are fed uniformly to the first cell, and 17 kg of ammonia are introduced. 13.6 m³ of clarified potassium dihydrogen phosphate solution per hour are obtained from the first stage and distributed between the first two cells.

The material remains in the cascade an average of approximately 30 minutes, with a reaction temperature of approximately 310 K. being maintained. The pH is 7.6 and is employed to control the process.

13.9 m³ of slurry coming from the last cell and 4.2 m³ of filtrate obtained for reclarification from the product-filtration system are fed to the clarifier per hour. 11.7 m³ of clarified mother liquor per hour leaves the clarifier and are recirculated to the first stage to be reacted with the triplesuperphosphate. It contains 96 g of potassium sulfate, 23 g of magnesium sulfate, 1 g of sodium sulfate, and 17 g of sodium chloride per 1000 g of water.

6.5 m³ of concentrated slurry per hour are fed to the product filter. 3.4 tons of moist potassium magnesium phosphate hexahydrate per hour are produced. The filter cake is not washed. Drying at 313 to 333 K. in a fluidized bed drier results in 2.5 tons of dry hexahydrate. This product comprises 73.5% potassium magnesium phosphate hexahydrate, 9.7% ammonium magnesium phosphate hexahydrate, and 9.2% other magnesium and calcium phosphates.

The product consists of
25.7% $P_2O_5$
15.6% $K_2O$
15.9% MgO
2.3% $SO_3$
0.4% Cl
36.6% water of crystallization.

The calcined product contains the nutrients
40.2% $P_2O_5$
24.3% $K_2O$
24.8% MgO.

The method yields
87.2% phosphate
97.4% potassium.

EXAMPLE 2

In the first stage of the process, in which 1.63 tons of triplesuperphosphate are reacted with 11.7 m$^3$ of mother liquor containing potassium sulfate to obtain potassium dihydrogen phosphate solution and gypsum, the reaction temperature is lowered to 313 K. and the dwell time is extended to 45 minutes by adding more cells to the compartmentalized cascade. A reaction gypsum that contains 9.1% $P_2O_5$ and 0.85% $K_2O$ in 1.15 tons of dry substance is obtained.

The yield of this process under these conditions is
86.0% phosphates
97.6% potassium.

EXAMPLE 3

0.75 tons of moist reaction gypsum obtained from the first stage of the process are mixed with 0.25 tons of milled triplesuperphosphate. The mixture is granulated in a roller mill. After drying, the granulate is removed in the form of a superphosphate product.

EXAMPLE 4

The drum filter employed for Example 1 is replaced by a pressure filter, allowing the cake to be dewatered to 18% moisture content. The content of magnesium sulfate in the mother liquor is 41 g per 1000 g of water. The optimal reation pH drops to 7.3 in the second stage. The quality of the potassium magnesium phosphate is almost unchanged.

EXAMPLE 5

With the overall conditions identical to those in Example 1, the reaction temperature in the second stage is lowered 2 degrees to 308 K. Once the mother liquor has been separated, the resulting potassium magnesium phosphate is washed with 0.4 m$^3$ of potassium dihydrogen phosphate solution from the first stage per ton of product. The wash filtrate is fed to the first cell of the second stage.

The content of potassium magnesium phosphate hexahydrate in the dry product is accordingly increased to 78%. The product contains 15.8% $K_2O$, 87.3% of which is bonded into potassium magnesium phosphate.

What is claimed is:

1. Method of preparing potassium magnesium phosphate hexahydrate by reacting calcium dihydrogen phosphate with potassium sulfate and a basic magnesium compound in a first stage and a second stage, comprising the following steps:
   providing said first stage with an inlet and an outlet;
   providing said second stage with an inlet and an outlet;
   introducing potassium sulfate into the second stage before or simultaneously with the addition into the second stage of magnesium oxide and/or hydroxide to produce potassium magnesium phosphate and a mother liquor containing potassium sulfate;
   said potassium magnesium phosphate being crystallized and separated from the mother liquor;
   recycling the mother liquor to the inlet of the first stage, where the mother liquor containing potassium sulfate is introduced into the first stage based upon the rate of reaction;
   introducing calcium dihydrogen phosphate into the inlet of the first stage;
   in said first stage reacting said potassium sulfate with said calcium dihydrogen phosphate to produce gypsum and potassium dihydrogen phosphate in a reacted-out slurry;
   introducing a suspension of the finely divided calcium dihydrogen phosphate in a reacted-out slurry that is obtained from the outlet of the first stage, and is recirculated back into the inlet of the first stage, and contains a seed in the form of the already formed gypsum, and is added to gypsum wash filtrate;
   in said first stage, dividing said practically reacted-out first stage slurry into two portions;
   recirculating one portion of said reacted-out first stage slurry to the inlet of the first stage from the outlet of the first stage to suspend the calcium dihydrogen phosphate;
   separating said gypsum from the other portion of said first stage slurry of the first stage;
   after the gypsum has been separated, leaving the potassium dihydrogen phosphate solution in said first stage slurry and transporting said solution to the inlet of the second stage from the outlet of the first stage;
   introducing into the inlet of the second stage the potassium dihydrogen phosphate solution from the outlet of the first stage along with, or immediately after, the addition of the magnesium oxide and/or hydroxide and potassium sulfate into the inlet of the second stage;
   recycling back to the inlet of the second stage a second stage slurry obtained from the outlet of the second stage, and said second stage slurry containing a seed in the form of the already formed potassium magnesium phosphate as it is being recirculated back into said second stage;
   introducing ammonia as a crystallization promoter into the second stage;
   dividing the second stage slurry leaving the outlet of the second stage into two portions;
   returning one portion of said second stage slurry from the outlet of the second stage to the inlet of the second stage;
   dividing the other portion of said second stage slurry by filtering out the potassium magnesium phosphate hexahydrate product that is not washed with water before being dried; and
   producing the mother liquor from the other portion of the second stage slurry that is recirculated from the outlet of the second stage to the inlet of the first stage.

2. Method according to claim 1, comprising suspending the calcium dihydrogen phosphate in water in the first stage with approximately the same amount of gypsum suspended in the potassium dihydrogen phosphate solution as it is formed and with the filtrate from washing the gypsum that is to be removed;

reacting in the first stage the calcium dihydrogen phosphate at a temperature of between 308° and 333° K. with the potassium sulfate in the mother liquor from the potassium magnesium phosphate crystallization that contains the potassium sulfate and is added in accordance with how rapidly the reaction is proceeding;

dividing the resulting, practically reacted-out slurry at the outlet of the first stage into two portions;

one portion of it being recycled from the outlet of the first stage to the inlet of the first stage; and the other portion being concentrated and filtered, subsequent to which the separated gypsum is washed and removed and the clarified potassium dihydrogen phosphate solution is transported from the outlet of the first stage to the inlet of the second stage.

3. Method according to claim 1, comprising removing gypsum from the outlet of the first stage;

washing the gypsum removed from the first stage with the same amount of water as was extracted along with the products of both stages in the form of water of crystallization and adherent water, less the amount of water formed during the reaction and introduced along with the reactants; and feeding the wash filtrate to the inlet of the first stage.

4. Method according to claim 1, wherein said potassium dihydrogen phosphate solution obtained from the first stage after the gypsum has been separated contains potassium phosphates and sulfates to the extent of 90 to 100 g of potassium dihydrogen phosphate and 15 to 25 g of potassium sulfate per 1000 g of water.

5. Method according to claim 1, comprising adding the magnesium oxide and/or hydroxide into the inlet of the second stage;

adding into the inlet of the second stage the potassium sulfate in the reacted-out slurry derived from the outlet of the second stage and recirculated to the inlet of the second stage;

subsequently adding to the inlet of the second stage the potassium dihydrogen phosphate solution obtained from the outlet of the first stage to form a reaction mixture;

stirring the reaction mixture for 20 to 30 minutes at 303° to 315° K. to form a slurry;

separating the slurry of the second stage into two portions;

recirculating one portion from the outlet of the second stage to the inlet of the second stage;

processing another portion by separating the potassium magnesium phosphate in the form of the hexahydrate from the mother liquor in the portion that is to be processed and removed as the product; and subsequently recirculating the mother liquor from the outlet of the second stage to the inlet of the first stage.

6. Method according to claim 1, wherein the potassium dihydrogen phosphate solution from the outlet of the first stage is transported to the inlet of the second stage; and adding into the inlet of the second stage the recirculated slurry from the outlet of the second stage, the magnesium oxide and/or hydroxide and potassium sulfate.

7. Method according to claim 6, comprising mixing the potassium sulfate with the magnesium oxide and/or hydroxide to form a combination before introducing this combination into the inlet of the second stage.

8. Method according to claim 1, wherein the mother liquor from the second stage contains 90 to 100 g of potassium sulfate and between 8 and 70 g of magnesium sulfate per 1000 g of water.

9. Method according to claim 1, comprising introducing ammonia into the reaction mixture at the inlet of the second stage at a ratio of at least 1 kg of ammonia/ton of potassium magnesium phosphate product and no more than 1 mole of ammonia/per mole of free phosphoric acid with impure calcium dihydrogen phosphate.

10. Method according to claim 1, wherein in the second stage washing the potassium magnesium phosphate not with water, but with said potassium dihydrogen phosphate solution; and recirculating the resulting wash filtrate from the outlet of the second stage to the inlet of the second stage.

* * * * *